(12) United States Patent
Kim (10) Patent No.: US 8,919,502 B2
(45) Date of Patent: Dec. 30, 2014

(54) CORD ASSEMBLY FOR REPLACEMENT OF OUTER BEAM AND CARRIER INCLUDING THE SAME

(71) Applicant: Mando Corporation, Gyeonggi-do (KR)

(72) Inventor: Beom Seok Kim, Seoul (KR)

(73) Assignee: Mando Corporation, Pyeongtaek, Si (KR)

( * ) Notice: Subject to any disclaimer, the term of this patent is extended or adjusted under 35 U.S.C. 154(b) by 72 days.

(21) Appl. No.: 13/676,724

(22) Filed: Nov. 14, 2012

(65) Prior Publication Data

US 2013/0118844 A1 May 16, 2013

(30) Foreign Application Priority Data

Nov. 14, 2011 (KR) .................. 10-2011-0118269

(51) Int. Cl.
*F16D 65/095* (2006.01)
*B60T 17/08* (2006.01)
*F16D 65/00* (2006.01)
*F16D 55/00* (2006.01)

(52) U.S. Cl.
CPC ............. *B60T 17/08* (2013.01); *F16D 65/0056* (2013.01); *F16D 2055/0008* (2013.01)
USPC ....................................... 188/71.1; 188/73.39

(58) Field of Classification Search
USPC .............. 188/73.1, 73.39–73.43, 207, 205 R, 188/206 R, 219.1
See application file for complete search history.

(56) References Cited

U.S. PATENT DOCUMENTS

| | | | | | |
|---|---|---|---|---|---|
| 3,829,825 | A | * | 8/1974 | Hawkins | 439/798 |
| 5,983,745 | A | * | 11/1999 | Petrak | 74/502.4 |
| 8,469,159 | B2 | * | 6/2013 | Lowe et al. | 188/73.1 |
| 2006/0219490 | A1 | * | 10/2006 | Eisengraber et al. | 188/71.1 |

FOREIGN PATENT DOCUMENTS

KR 1020110055805 5/2011

* cited by examiner

*Primary Examiner* — Christopher Schwartz
(74) *Attorney, Agent, or Firm* — Ohlandt Greeley Ruugiero & Perle L.L.P.

(57) ABSTRACT

Disclosed herein are a cord assembly for replacement of an outer beam and a carrier including the same which may provide an improved degree of freedom in design and prevent damage to the carrier. The cord assembly for replacement of an outer beam, which is fastened to a carrier at which a pair of pad plates is installed to be movable forward and backward with pads attached to inner surfaces of the pad plates to be squeezed against a disc rotating together with a wheel of a vehicle, includes at least one cord having a predetermined stiffness and formed by twisting at least two steel wires and fasteners fastened to both ends of the at least one cord to be installed at coupling portions protruding respectively from both ends of the carrier.

7 Claims, 8 Drawing Sheets

CORD ASSEMBLY FOR REPLACEMENT OF OUTER BEAM AND CARRIER INCLUDING THE SAME

CROSS-REFERENCE TO RELATED APPLICATION(S)

This application claims the benefit of Korean Patent Application No. 2011-118269, filed on Nov. 14, 2011 in the Korean Intellectual Property Office, the disclosure of which is incorporated herein by reference.

BACKGROUND

1. Field

Embodiments of the present invention relate to a cord assembly for replacement of an outer beam and a carrier including the same which may provide an improved degree of freedom in design and prevent damage to the carrier.

2. Description of the Related Art

A disc brake installed in a vehicle is generally used to decelerate or stop a vehicle, or to keep a vehicle stopped. The disc brake generates braking force by squeezing pads against both sides of a circular plate-shaped disc rotating together with a wheel.

Figure 1:
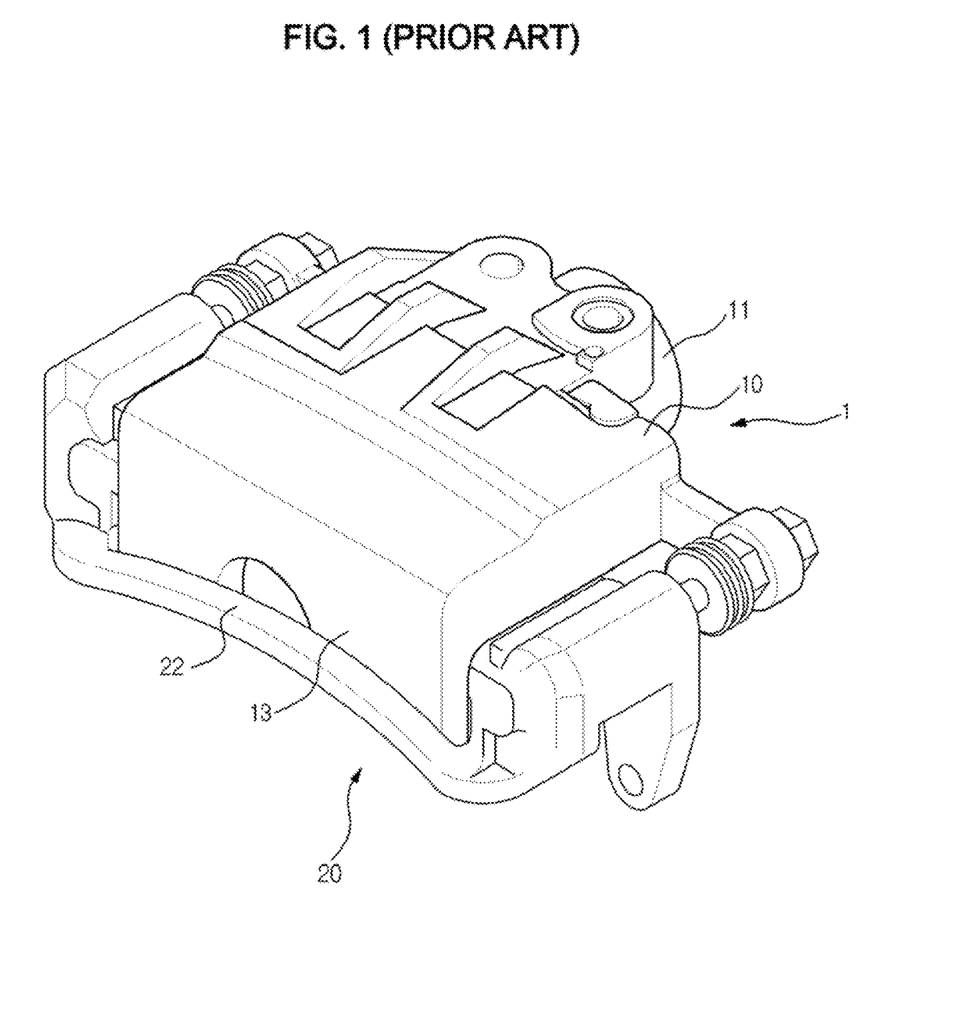
FIG. 1 is an expanded perspective view schematically illustrating a conventional disc brake.
Figure 2:
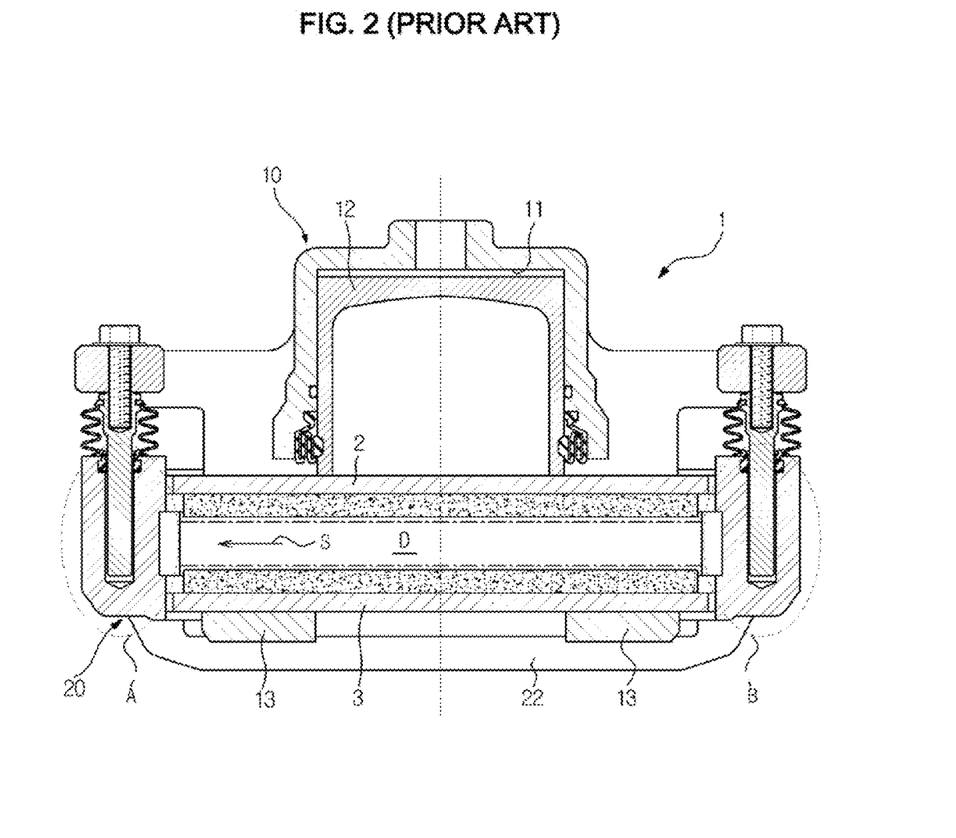
FIG. 2 is a longitudinal sectional view schematically illustrating the conventional disc brake for explanation of a possible disadvantage of the conventional disc brake.

As shown in FIGS. 1 and 2, such disc brake 1 includes a caliper housing 10 in which a piston 12 movable forward and backward by hydraulic brake pressure is installed, a carrier 20 at which a pair of pad plates 2 with attached pads is installed and which is fixed to a vehicle body, a disc D rotating together with a wheel, with a portion of an outer circumferential surface of the disc inserted between the pair of pad plates 2 and 3.

The carrier 20 is mounted on a knuckle (not shown) of the vehicle body through bolts such that a pair of pad plates 2 and 3 having the disc D therebetween is installed inside the carrier 20 to be slidable. In addition, the carrier 20, which is a component that supports a torque generated when braking is performed by the disc brake 1, is loaded by force in the rotational direction S of the disc D, and is thus provided with an outer beam 22 so as not to be deformed by the force.

When a driver steps on a brake pedal (not shown) while driving, the disc brake 1 configured as above is operated in such a way that hydraulic brake pressure formed in a master cylinder (not shown) is transferred into a cylinder 11 of the caliper housing 10, and the piston 12 arranged in the cylinder 11 moves forward. As the piston 12 moves forward, a pad attached to the pad plate 2 adjacent to the piston 12 is immediately pressed against one side of the disc. At the same time, since there is residual hydraulic pressure in the cylinder 11, the caliper housing 10 itself moves in the opposite direction to movement of the piston 12 such that a finger 13 arranged on one side of the caliper housing 10 opposite to the cylinder 11 pushes the other pad plate 3 toward the other side of the disc D to press the other pad plate 3 against the other side of the disc D. Accordingly, braking is performed as the pair of the pad plates 2 and 3 is pressed against the disc D.

When braking pressure is applied by the disc brake 1 to the disc D rotating at high speed, large friction is generated. That is, due to tangential force generated by rotational torque when the brake is applied, most load is applied by the rotational torque to a portion of the carrier 20 which is in the direction S toward which the disc D rotates, and thus the carrier 1 may often be deformed. To prevent such deformation of the carrier 20, an outer beam 22 may be necessary.

With reference to FIG. 2, when the brake is applied, the rotational torque is generated at portion A of the carrier 20 which is in the direction S in which the disc D rotates and most load is applied to a portion A. In order to arrange a portion B of the carrier 20 to support load from the rotational torque applied to portion A, the outer beam 22 may need to be arranged to connect both ends of the carrier 20. That is, since the outer beam 22 serves to support load by tension and bending of the carrier, the outer beam 22 may need to maintain a certain volume.

However, the carrier 20, which is manufactured by processing a casting material, is generally integrated with the outer beam 22. Accordingly, in conventional cases, when the carrier 20 integrated with the outer beam 22 is manufactured, design may be much limited due to interference with a working tool or a gap between a wheel and the caliper housing 10. In addition, for a compact vehicle, the space for installation of the outer beam 22 may not be sufficient. Thus, the volume of the outer beam 22 formed outside the carrier 20 may be reduced to ensure the gap between the wheel and the caliper housing 10, but in this case the outer beam 22 may fail to withstand the rotational torque and be bent and in the worst case may be fractured.

SUMMARY

Therefore, it is an aspect of the present invention to provide a cord assembly for replacement of an outer beam and a carrier including the same which may eliminate an outer beam by arranging the cord assembly to take the role of the outer beam, while maintaining the stiffness of the carrier.

It is another aspect of the present invention to provide a cord assembly for replacement of an outer beam and a carrier including the same that may allow a cord for replacement of the outer beam to be easily fastened to the carrier.

Additional aspects of the invention will be set forth in part in the description which follows and, in part, will be obvious from the description, or may be learned from practice of the invention.

In accordance with one aspect of the present invention, a cord assembly for replacement of an outer beam, which is fastened to a carrier at which a pair of pad plates is installed to be movable forward and backward with pads attached to inner surfaces of the pad plates to be squeezed against a disc rotating together with a wheel of a vehicle, includes at least one cord having a predetermined stiffness and formed by twisting at least two steel wires, and fasteners fastened to both ends of the cord to be installed at the coupling portions protruding respectively from both ends of the carrier.

The at least one cord may include a plurality of cords installed to be regularly spaced and to connect the coupling portions at both ends of the carrier.

A cover layer made of rubber may be formed on an outer circumferential surface of the cord.

The cord may be arranged to have a plurality of steel wire layers formed by twisting the at least two steel wires.

Each of the fasteners may include a body which is provided with a through hole in a longitudinal direction so that the cord is inserted into the through hole and is tapered at one side to have a conical shape, and at least one open cutting which is regularly spaced at one side of the body along an outer circumferential surface of the body and is cut open to have a predetermined length from the one side of the body toward the other side of the body, wherein, when pressed by the at least one open cutting, the one side of the body is elastically deformed toward the cord to closely contact an outer circumferential surface of the cord.

The through hole is formed to have a decreased diameter corresponding to an outer diameter of the cord at the other side of the body.

In accordance with another aspect of the present invention, a carrier, at which a pair of pad plates is installed to be movable forward and backward with pads attached to inner surfaces of the pad plates to be squeezed against a disc rotating together with a wheel of a vehicle, includes coupling portions respectively protruding from both ends of the carrier to face each other, and coupling holes respectively formed at the coupling portions to face each other, wherein the cord assembly for replacement of an outer beam according to one of the claims 1 to 6 is fastened to the coupling holes to endure a torque applied by the disc when braking is performed.

Each of the coupling holes may be provided with an insertion hole into which the cord is inserted and a fastening hole into which the fastener is inserted, the insertion hole and the fastening hole communicating with each other.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings. It should be understood that the terms used in the specification and appended claims should not be construed as limited to general and dictionary meanings but should be construed based on the meanings and concepts according to the spirit of the present invention on the basis of the principle that the inventor is permitted to define appropriate terms for best explanation. The embodiments described in the specification and shown in the drawings are purely illustrative and are not intended to represent all aspects of the invention, such that various equivalents and modifications may be made without departing from the spirit of the invention.

Figure 3:
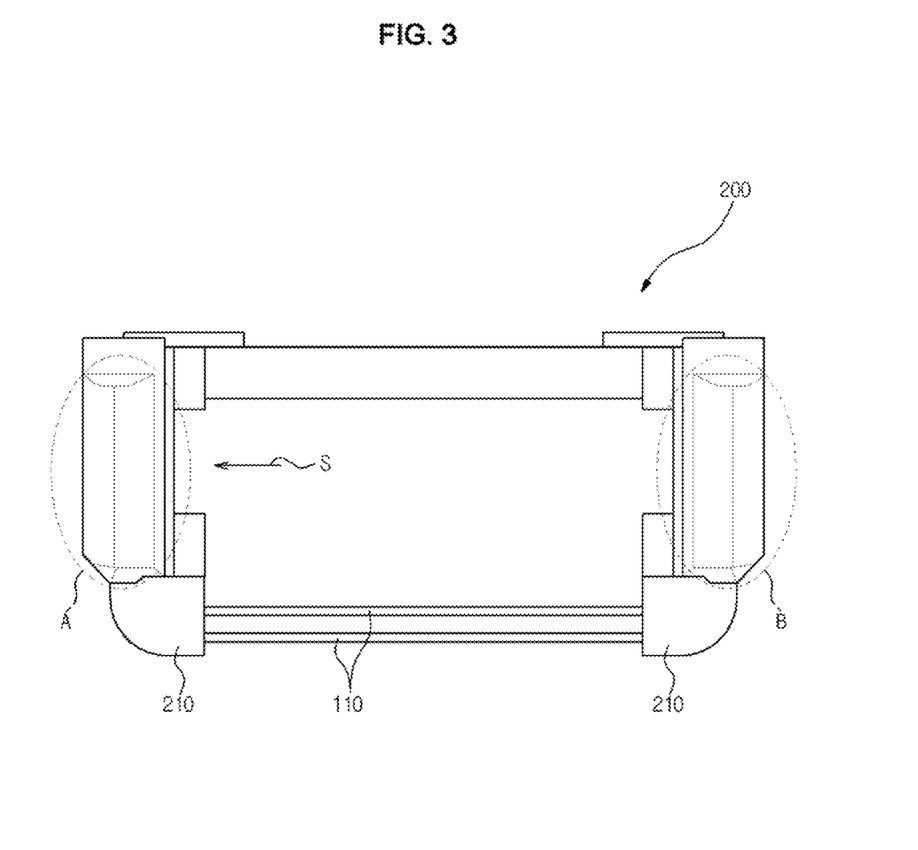
FIG. 3 is a top view illustrating a carrier provided with a cord assembly in accordance with an exemplary embodiment of the present invention.
Figure 4:
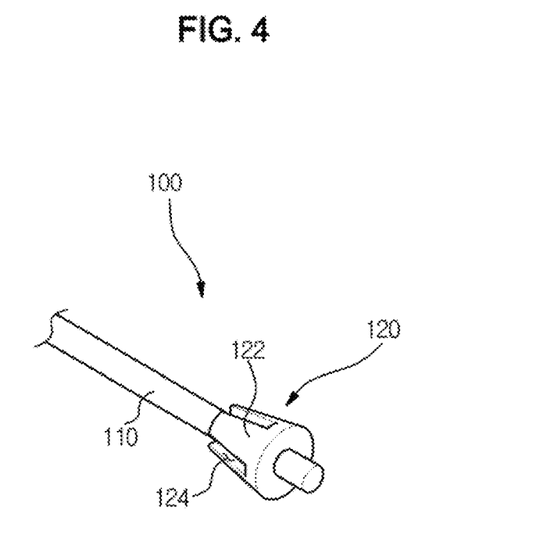
FIG. 4 is a perspective view illustrating the cord assembly in accordance with the illustrated embodiment of the present invention.
Figure 5:
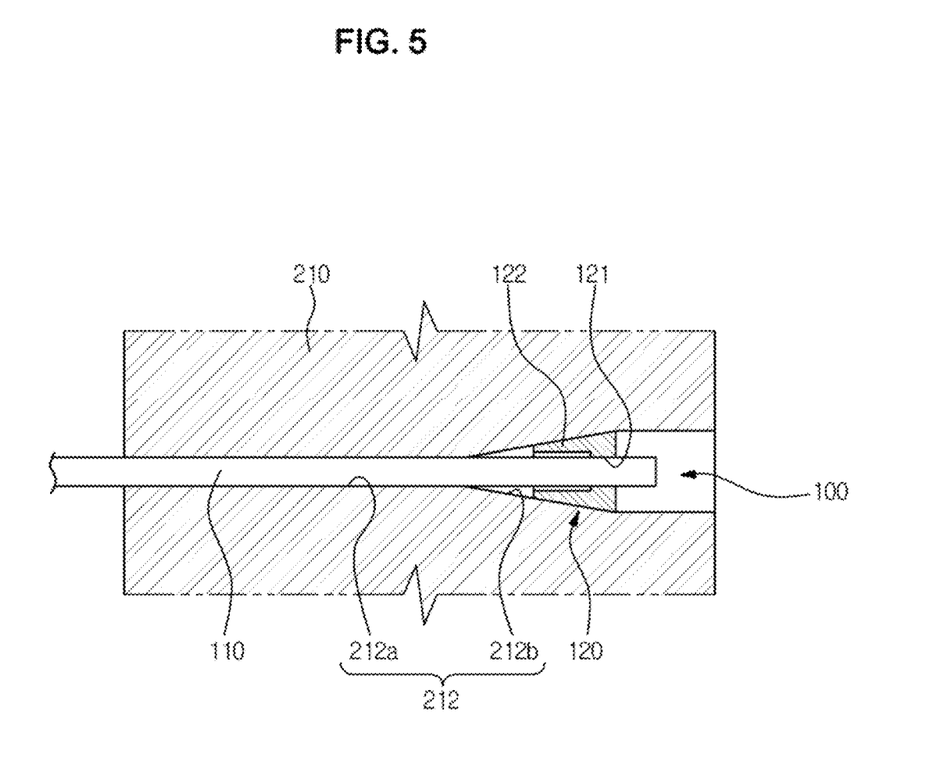
FIG. 5 is a sectional view schematically illustrating the cord assembly installed at the carrier in accordance with the illustrated embodiment of the present invention.

FIG. 3 is a top view illustrating a carrier provided with a cord assembly in accordance with an exemplary embodiment of the present invention, FIG. 4 is a perspective view illustrating the cord assembly in accordance with the illustrated embodiment of the present invention, and FIG. 5 is a sectional view schematically illustrating the cord assembly installed at the carrier in accordance with the illustrated embodiment of the present invention.

With reference to FIGS. 3 to 5, a cord assembly 100 is installed at a carrier 200 at which a pair of pad plates (not shown) are installed to be movable forward and backward with pads attached to inner surfaces of the pad plates to be squeezed against a disc (not shown) rotating together with a wheel of a vehicle.

The carrier 200 includes coupling portions 210 respectively protruding from both ends of the carrier 200 to face each other and allowing the cord assembly 100 to be fastened thereto, and coupling holes 212 respectively formed at the coupling portions 210 to face each other. The coupling portions 210 and coupling holes 212 will be explained later in the present application.

According to the illustrated embodiment of the present invention, the cord assembly 100 includes at least one cord 110 having a predetermined stiffness and formed by twisting at least two steel wires 111, and fasteners 120 fastened to both ends of the at least one cord 110.

Figure 7:
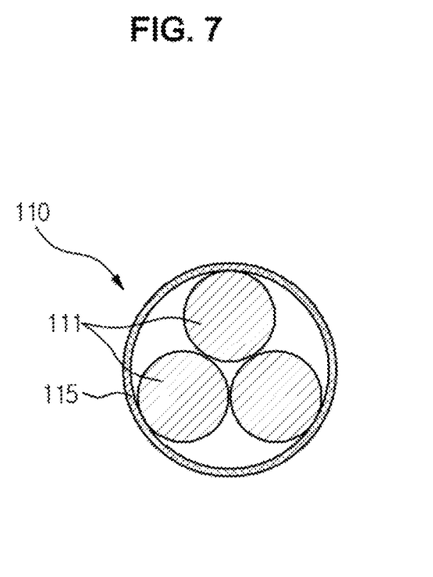
FIG. 7 is a sectional view illustrating an embodiment of a cord provided at the cord assembly in accordance with the illustrated embodiment of the present invention.

The cord 110 is installed at the coupling portions 210 at both ends of the carrier 200 by the fasteners 120 such that when braking is performed and rotational torque is applied to the carrier 200 in the rotational direction S of the disc (not shown), portion B serves to support the load applied to portion A. The cord 110 is formed by twisting the at least two steel wires 111 to be flexible and support a tension acting in a longitudinal direction. And a cover layer 115 made of rubber is formed at an outer circumferential surface of the cord 110, as shown in FIG. 7. The cover layer 115 serves to prevent corrosion of the steel wires 111 and the noise according to vibration of the cord 110.

Figure 8:
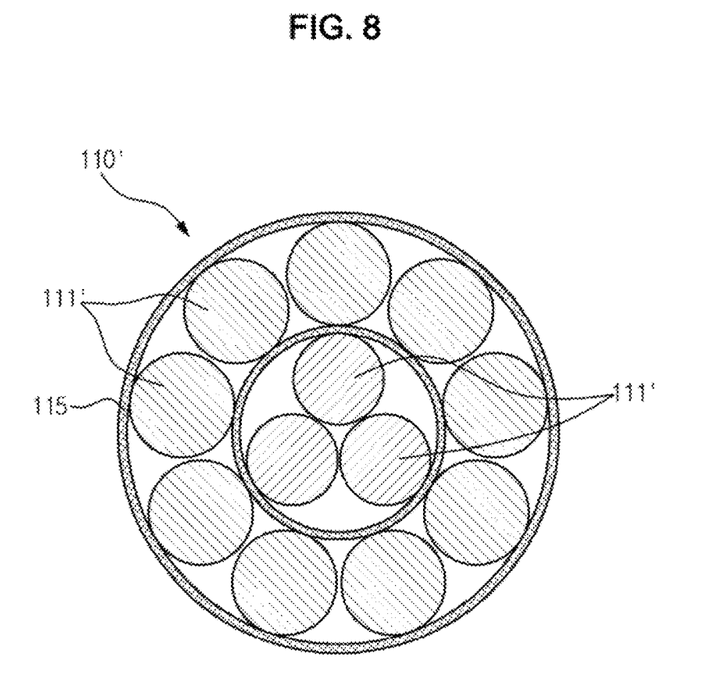
FIG. 8 is a sectional view illustrating another embodiment of the cord provided at the cord assembly in accordance with the illustrated embodiment of the present invention.

FIG. 7 shows the cord 110 as formed by twisting three steel wires 111, but embodiments of the present invention are not limited thereto. A plurality of steel wire layers formed by twisting at least two steel wires 111 may be arranged. For example, as shown in FIG. 8, a cord 110' has two steel wire layers formed by twisting at least two steel wires 111'. That is, the cords 110 and 110' may be selectively employed by decreasing or increasing the number of the steel wires 111 and 111' and the number of the steel wire layers. The cover layer 115 should be formed on the outer surface of the cords 110 and 110', that is, at the outermost side of the steel wire layers to prevent corrosion of the steel wires.

With reference to FIGS. 3 to 5, a plurality of the cords 110 having a structure as above is installed to be regularly spaced and to connect the coupling portions 210 at both ends of the carrier 200. In the illustrated case, two cords 110 are connected to the coupling portions 210, but the number of the cords 110 to be installed is not limited so long as the cords 110 do not interfere with fingers (see reference numeral 13 in FIGS. 1 and 2) of the caliper housing (see reference numeral 10 in FIGS. 1 and 2).

In order to facilitate installation of such cord 110 at the coupling portions 210, fasteners 120 are installed at both sides of the cord 110. Each of the fasteners 120 includes a body 122 tapered on one side to have a conical shape and open cuttings 124 cut open from the one side of the body 122 toward the other side of the body 122.

The body 122 is provided with a through hole 121 arranged in a longitudinal direction so that the cord 110 is inserted into the through hole 121. The through hole 121 is formed to have a decreased diameter corresponding to an outer diameter of the cord 110 at the other side of the body 122. That is, the cord 110 fitted into the fastener 120 through the through hole 121 is arranged to have the same diameter as the diameter of the through hole 121 at the other side of the body 122 such that the cord 110 closely contacts the through hole 121 to form a close combination.

Figure 6:
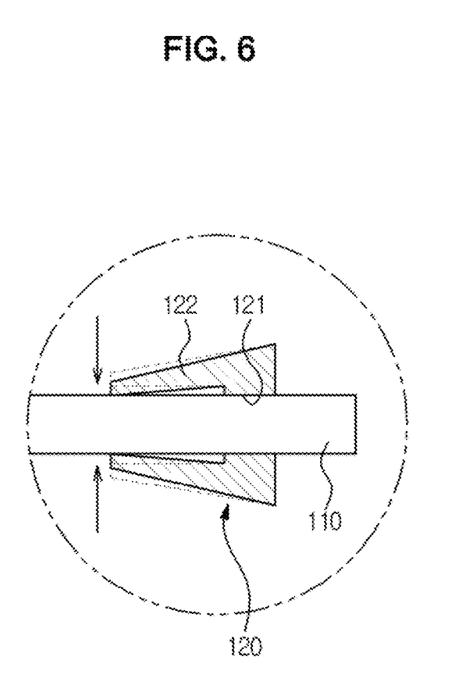
FIG. 6 is a view illustrating elastic deformation of a fastener of the cord assembly in accordance with the illustrated embodiment of the present invention.

The at least one open cuttings 124 formed on the one side of the body 122 includes a plurality of open cuttings regularly spaced along an outer circumferential surface of the body 122. The open cuttings 124 are formed to elastically deform the body 122. With reference to FIG. 6, when the body 122 is pressed from the outside toward the inside of the body 122, parts of the body 122 between the open cuttings 124 are elastically deformed by the open cuttings 124, and thereby the body 122 is squeezed against the outer circumferential surface of the cord 110 passing through the body 122 to form a strong connection with the cord 110.

The coupling holes 212 formed at the coupling portions 210 will now be briefly described prior to providing an explanation of fastening the cord assembly 100 to the coupling portions 210 of the carrier 200.

A pair of coupling portions 210 protrudes respectively from both ends of the carrier 200 to face each other. The coupling holes 212 are formed at the coupling portions 210 to face each other. Each of the coupling holes 212 is provided with an insertion hole 212a into which the cord 110 is inserted and a fastening hole 212b into which the fastener 120 is inserted. The insertion hole 212a and the fastening hole 212b communicate with each other in the longitudinal direction. In addition, the fastening hole 212b has a shape corresponding to the shape of the fastener 120.

That is, as shown in FIG. 5, the fastening hole 212b is formed to correspond to the outer circumferential surface of the body 122 tapered to have a conical shape. Accordingly, when the fastener 120 is inserted into and pressed against the fastening hole 212b to be coupled with the fastening hole 212b, the fastener 120 is pressed and parts of the body 122 elastically deformed by the open cuttings 124 closely contact the cord 110 to form a strong connection.

Hereinafter, fastening the cord assembly 100 to the coupling portions 210 of the carrier 200 will be described.

The cord 110 with a predetermined length is prepared and one of the fasteners 120 is installed at one side of the cord 110. Once one fastener 120 is installed at the one side of the cord 110, the other side of the cord 110 at which the fastener 120 is not installed is inserted into the coupling hole 212 formed at one of the coupling portions 210 of the carrier 200, which has no outer beam, and then into the coupling hole 212 at the other coupling portion 210 to be connected thereto.

Then, as shown in FIG. 5, the fastener 120 installed at the cord 110 is positioned at the coupling hole 212 into which the cord 110 has first been inserted. When the other side of the cord 110 is pulled, the fastener 120 is pressed against the fastening hole 212b of the coupling hole 212, and parts of the body 122 provided with the open cuttings 124 are elastically deformed to closely contact the cord 110. Thereby, one side of the cord assembly 100 is kept fastened to one coupling portion 210.

Next, another fastener 120 is installed at the portion of the cord 110 exposed through the other coupling portion 210 to which the fastener 120 is not coupled yet. When the fastener 120 is inserted into the coupling hole 212 and pressed with the cord 110 pulled, the end of one side of the fastener 120 is pressed by the end portion of the fastening hole 212b to closely contact the outer circumferential surface of the cord 110. Thereby, both sides of the cord 110 are fixed to the coupling portions 210 by the fasteners 120, and the cord 110 connects the coupling portions 210 in a tensioned state.

The ends of the cord 110 passed through the fasteners 120 may be cut off so as not to be exposed to the outside to provide more elegant appearance to the carrier 200, and further separate operations of welding or molding may be performed at the outer ends of the fasteners 120 through which the cord 110 is passed to ensure that the cord 110 is firmly fixed to the fasteners 120.

Consequently, the cord assembly 100 in accordance with the embodiments of the present invention may be easily fastened to the carrier 200, and since the outer beam is eliminated, the weight and cost of the carrier 200 may be reduced. That is, in the case of the carrier 200 having the cord assembly 100, interference with a working tool and/or the caliper housing may be prevented when the carrier 200 is manufactured, in contrast with conventional cases in which the outer beam is integrated into the carrier 200, and accordingly limitations to design of the carrier 200 may be addressed.

In addition, in case of the carrier 200 having the cord assembly 100, the cord 110 occupying a predetermined volume is connected to the carrier 200, and thus a space for installation of the carrier 200 may be easily ensured even in a compact car which does not have enough space for installation of a conventional outer beam.

As is apparent from the above description, a cord assembly for replacement of an outer beam and a carrier including the same according to the embodiments of the present invention connect cords taking the role of an outer beam to the carrier, and thus may reduce the weight and cost of the carrier. In addition, as the outer beam is eliminated, there is no possibility of the outer beam being bent or fractured and thus accidents may be prevented. Further, due to a simple structure of the cord assembly installed at the carrier, interference with a wheel and/or caliper housing may be avoided when the carrier is manufactured, and accordingly limitations to design of the carrier may be eliminated.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A cord assembly for replacement of an outer beam, which is fastened to a carrier at which a pair of pad plates is installed to be movable forward and backward with pads attached to inner surfaces of the pad plates to be squeezed against a disc rotating together with a wheel of a vehicle, comprising:
   at least one cord having a predetermined stiffness and comprising at least two twisted steel wires; and
   fasteners fastened to both ends of the at least one cord to be installed at coupling portions protruding respectively from both ends of the carrier, wherein each of the fasteners comprises a body which is provided which a through hole in a longitudinal direction so that the cord is inserted into the through hole, and is formed to have a decreased diameter corresponding to an outer diameter of the cord at the other side of the body.

2. The cord assembly according to claim 1, wherein the at least one cord comprises a plurality of cords installed to be regularly spaced and to connect the coupling portions at both ends of the carrier.

3. The cord assembly according to claim 1, wherein a cover layer made of rubber is formed on an outer circumferential surface of the at least one cord.

4. The cord assembly according to claim 1, wherein the cord comprises a plurality of steel wire layers of the at least two twisted steel wires.

5. The cord assembly according to claim 1, wherein each of the fasteners further comprises:
- at least one open cutting which is regularly spaced at one side of the body along a circumferential surface of the body and is cut open to have a predetermined length from the one side of the body toward the other side of the body, wherein the one side of the body is elastically deformed toward the cord to closely contact an outer circumferential surface of the cord.

6. The cord assembly according to claim 1, wherein the carrier comprises:
- coupling portions respectively protruding from both ends of the carrier to face each other; and
- coupling holes respectively formed at the coupling portions to face each other, wherein the cord assembly is fastened to the coupling holes to endure a torque applied by the disc when braking is performed.

7. The cord assembly according to claim 6, wherein each of the coupling holes is provided with an insertion hole into which the cord is inserted and a fastening hole into which the fastener is inserted, the insertion hole and the fastening hole communicating with each other.

\* \* \* \* \*